United States Patent [19]

Concepcion-Diaz

[11] Patent Number: 5,484,287
[45] Date of Patent: Jan. 16, 1996

[54] CHARACTER REVEALING GAME, METHOD OF MAKING, AND METHOD OF PLAYING

[75] Inventor: Abelardo Concepcion-Diaz, Fajardo, Puerto Rico

[73] Assignee: Commonwealth of Puerto Rico, San Juan, Puerto Rico

[21] Appl. No.: 213,708

[22] Filed: Mar. 16, 1994

[51] Int. Cl.⁶ .................................................... G09B 19/22
[52] U.S. Cl. ........................... 434/128; 273/429; 434/189
[58] Field of Search ...................................... 434/128, 188, 434/189, 195, 207, 208, 327, 322; 273/153 R, 429, 430, 431

[56] References Cited

U.S. PATENT DOCUMENTS

| | | |
|---|---|---|
| 1,666,641 | 4/1928 | Des Enfants . |
| 2,234,341 | 3/1941 | Goldner . |
| 2,460,563 | 2/1949 | Zelvin . |
| 2,514,636 | 7/1950 | Glaze . |
| 2,899,757 | 8/1959 | Webb . |
| 3,204,343 | 9/1965 | Pollock . |
| 3,332,156 | 7/1967 | Reeves . |
| 3,687,456 | 8/1972 | Vann . |
| 3,864,850 | 2/1975 | Helmecke ................................ 434/207 |
| 3,872,610 | 3/1975 | Dumovich . |
| 4,494,756 | 1/1985 | Winer .................................... 273/156 |
| 4,633,070 | 12/1986 | Merkh . |
| 4,804,187 | 2/1989 | Cramer . |
| 4,812,123 | 3/1989 | House . |
| 4,886,457 | 12/1989 | Low-Jeng . |

*Primary Examiner*—Gene Mancene
*Assistant Examiner*—Jeffrey A. Smith
*Attorney, Agent, or Firm*—Oblon, Spivak, McClelland, Maier & Neustadt

[57] ABSTRACT

A character revealing game having a ternary game piece, a plurality of character revealing elements and a character decoding device. A surface area of the ternary game piece is divided into sub-areas, and pictoral characters are arranged on the sub-areas in groups such that all characters arranged in a given group share a common indicium which is different from indicia of pictoral characters of any of the other groups. Each character revealing element has an indicium identical to a indicium of pictoral characters of exactly one group arranged on the ternary game piece. The arrangement of particular pictoral characters in particular groups on the ternary game piece takes advantage of particular characteristics of a distinct ternary number representation assigned to each pictoral character so that a first player may ascertain a pictoral character secretly selected by a second player merely by knowing all indicia with which the secretly selected pictoral character appears on the ternary game piece. The first player successively arranges the character revealing elements having indicia identical to those in which the secretly selected pictoral character appears on the ternary game piece in an additive manner such that a total physical length of the character revealing elements is formed, and ascertains the secretly selected pictoral character which corresponds to this total physical length via the character decoding device.

19 Claims, 5 Drawing Sheets

FIG. 2

| LETTER (6) | DECIMAL (BASE 10) (8) | TERNARY (BASE 3) (10) | RED (12) | PURPLE (14) | GREEN (16) | ORANGE (19) | BLUE (20) | YELLOW (22) |
|---|---|---|---|---|---|---|---|---|
| A | 1 | 001 | | | | | | X |
| B | 2 | 002 | | | | | X | |
| C | 3 | 010 | | | | X | | |
| D | 4 | 011 | | | | X | | X |
| E | 5 | 012 | | | | X | X | |
| F | 6 | 020 | | | X | | | |
| G | 7 | 021 | | | X | | | X |
| H | 8 | 022 | | | X | | X | |
| I | 9 | 100 | | X | | | | |
| J | 10 | 101 | | X | | | | X |
| K | 11 | 102 | | X | | | X | |
| L | 12 | 110 | | X | | X | | |
| M | 13 | 111 | | X | | X | | X |
| N | 14 | 112 | | X | | X | X | |
| O | 15 | 120 | | X | X | | | |
| P | 16 | 121 | | X | X | | | X |
| Q | 17 | 122 | | X | X | | X | |
| R | 18 | 200 | X | | | | | |
| S | 19 | 201 | X | | | | | X |
| T | 20 | 202 | X | | | | X | |
| U | 21 | 210 | X | | | X | | |
| V | 22 | 211 | X | | | X | | X |
| W | 23 | 212 | X | | | X | X | |
| X | 24 | 220 | X | | X | | | |
| Y | 25 | 221 | X | | X | | | X |
| Z | 26 | 222 | X | | X | | X | |

FIG. 3A

| DECIMAL | TERNARY | LETTER |
|---------|---------|--------|
| 1 | 001 | A |
| 4 | 011 | D |
| 7 | 021 | G |
| 10 | 101 | J |
| 13 | 111 | M |
| 16 | 121 | P |
| 19 | 201 | S |
| 22 | 211 | V |
| 25 | 221 | Y |

FIG. 3B

| DECIMAL | TERNARY | LETTER |
|---------|---------|--------|
| 2 | 002 | B |
| 5 | 012 | E |
| 8 | 022 | H |
| 11 | 102 | K |
| 14 | 112 | N |
| 17 | 122 | Q |
| 20 | 202 | T |
| 23 | 212 | W |
| 26 | 222 | Z |

FIG. 3C

| DECIMAL | TERNARY | LETTER |
|---------|---------|--------|
| 3 | 010 | C |
| 4 | 011 | D |
| 5 | 012 | E |
| 12 | 110 | L |
| 13 | 111 | M |
| 14 | 112 | N |
| 21 | 210 | U |
| 22 | 211 | V |
| 23 | 212 | W |

FIG. 3D

| DECIMAL | TERNARY | LETTER |
|---------|---------|--------|
| 6 | 020 | F |
| 7 | 021 | G |
| 8 | 022 | H |
| 15 | 120 | O |
| 16 | 121 | P |
| 17 | 122 | Q |
| 24 | 220 | X |
| 25 | 221 | Y |
| 26 | 222 | Z |

FIG. 3E

| DECIMAL | TERNARY | LETTER |
|---------|---------|--------|
| 9 | 100 | I |
| 10 | 101 | J |
| 11 | 102 | K |
| 12 | 110 | L |
| 13 | 111 | M |
| 14 | 112 | N |
| 15 | 120 | O |
| 16 | 121 | P |
| 17 | 122 | Q |

FIG. 3F

| DECIMAL | TERNARY | LETTER |
|---------|---------|--------|
| 18 | 200 | R |
| 19 | 201 | S |
| 20 | 202 | T |
| 21 | 210 | U |
| 22 | 211 | V |
| 23 | 212 | W |
| 24 | 220 | X |
| 25 | 221 | Y |
| 26 | 222 | Z |

CHARACTER REVEALING GAME, METHOD OF MAKING, AND METHOD OF PLAYING

BACKGROUND OF THE INVENTION

1. Field of the Invention

This invention relates generally to games in the fields of education and entertainment, and in particular to a character revealing game based on the ternary (base 3) number system.

More specifically, a preferred embodiment of the present invention is directed to a two-person character revealing game wherein characters are arranged on a main game piece in accordance with characteristics of the ternary number system such that one player can ascertain a particular character secretly selected by the other player simply by knowing the color or colors in which the secretly selected character appears on the main game piece.

2. Description of the Related Art

Many character revealing game devices have been developed wherein one player will secretly select a character from a set of characters and another player ascertains the selected character in accordance with certain information acquired via inquiry permissible under the rules of the game. U.S. Pat. No. 4,886,457 to Lon-Jeng discloses such a learning device for children wherein a particular character is secretly selected by a teacher from a series of cards on which a plurality of characters are printed. Upon learning via inquiry on which particular cards the selected character appears, a student places masks over a main card on which all characters from each of the cards are printed. After appropriate placement of masks corresponding to each card upon which the selected character appears, only the selected character will be displayed on the main card, all other characters on the main card will have been covered by the masks.

U.S. Pat. No. 3,687,456 to Vann likewise discloses a mathematical game apparatus wherein a secretly selected number is revealed by the strategic placement of masks over numbered cards to obscure certain numbers and reveal others. Appropriate masking in accordance with certain information will reveal only the selected number. Such game devices, however, do not permit a student to visually observe any mathematical operations and thus are lacking in didactic value. Furthermore, these game devices require several number or character cards and a corresponding number of masks, and are thus cumbersome to own and difficult to learn to play.

U.S. Pat. Nos. 4,812,123 (House), 2,514,633 (Glaze), 2,899,757 (Webb), and 3,204,343 (Pollock) disclose visual arithmetic teaching devices wherein physical elements of differing lengths corresponding to magnitudes of particular numbers are stacked or otherwise aligned in an end-to-end manner so that the total height or length of the stacked or aligned elements, which represents the arithmetic sum of numbers having magnitudes corresponding to the lengths of each of the individual physical elements, will reach a level along a calibrated measuring scale indicating the correct sum.

U.S. Pat. Nos. 3,872,610 (Dumovich), 4,633,070 (Merkh), and 3,332,156 (Reeves) disclose mathematical teaching devices wherein numbers represented in one base number system are converted to corresponding numbers in another base number system. Such visual arithmetic teaching devices and numerical base conversion devices, while valuable as didactic aids, would not greatly appeal to young children since they are not in any way recreational in nature.

A game device which is both didactic and recreational in nature is therefore desirable. Such a game will greatly appeal to children due to its recreational nature, and children will benefit through visualizing basic arithmetic operations and through mentally engaging in the process of character recognition while playing the game.

SUMMARY OF THE INVENTION

It is an object of the present invention to provide a character revealing game that overcomes the above-mentioned drawbacks of the prior art. Accordingly, the present invention is directed to a two-person character revealing game comprising a ternary game piece having a surface area on which distinct pictoral characters are arranged in groups such that all of said distinct pictoral characters within a given group share a common indicium;

a plurality of character revealing elements, each one of said plurality of character revealing elements having a distinct physical length and an indicium corresponding to an indicium of exactly one of said groups of distinct pictoral characters arranged on said ternary game piece; and a character decoding device having means for permitting arrangement of at least one of said plurality of character revealing elements in an additive manner such that a total physical length of said at least one of said plurality of character revealing elements is formed, and decoding means for ascertaining one of said distinct pictoral characters corresponding to said total physical length of said at least one of said plurality of character revealing elements.

In operation of the game, a first player reveals any character on the ternary game piece secretly selected by a second player after ascertaining from the second player all indicia with which the secretly selected character appears on the ternary game piece. Upon ascertaining this information, the first player arranges the character revealing elements having corresponding indicia in an end-to-end additive manner. The total length of these aligned character revealing elements is then decoded by the character decoding device to reveal the character secretly selected by the second player.

The character revealing game of the present invention is thus recreational and didactic in nature. The excitement and intrigue of "guessing" a secretly selected character will draw the attention and appeal of children, and they will beneficially learn by mentally engaging in character recognition and by visualizing basic addition through the alignment of differing length character revealing elements.

BRIEF DESCRIPTION OF THE DRAWING FIGURES

A more complete appreciation of the present invention and many of the attendant advantages thereof will be readily obtained as the same becomes better understood by reference to the following detailed description when considered in connection with the accompanying drawings, wherein:

FIG. 2 is a table listing letters of the alphabet to which numbers represented in both the decimal and ternary systems have been assigned, along with an indication of all colors in which each letter appears on the ternary game piece;

FIGS. 3A, 3B, 3C, 3D, 3E and 3F are tables listing letters of the alphabet whose assigned decimal numbers have ternary representations with a common ternary digit in a common ternary digit place;

DETAILED DESCRIPTION OF THE PREFERRED EMBODIMENT

Figure 1:
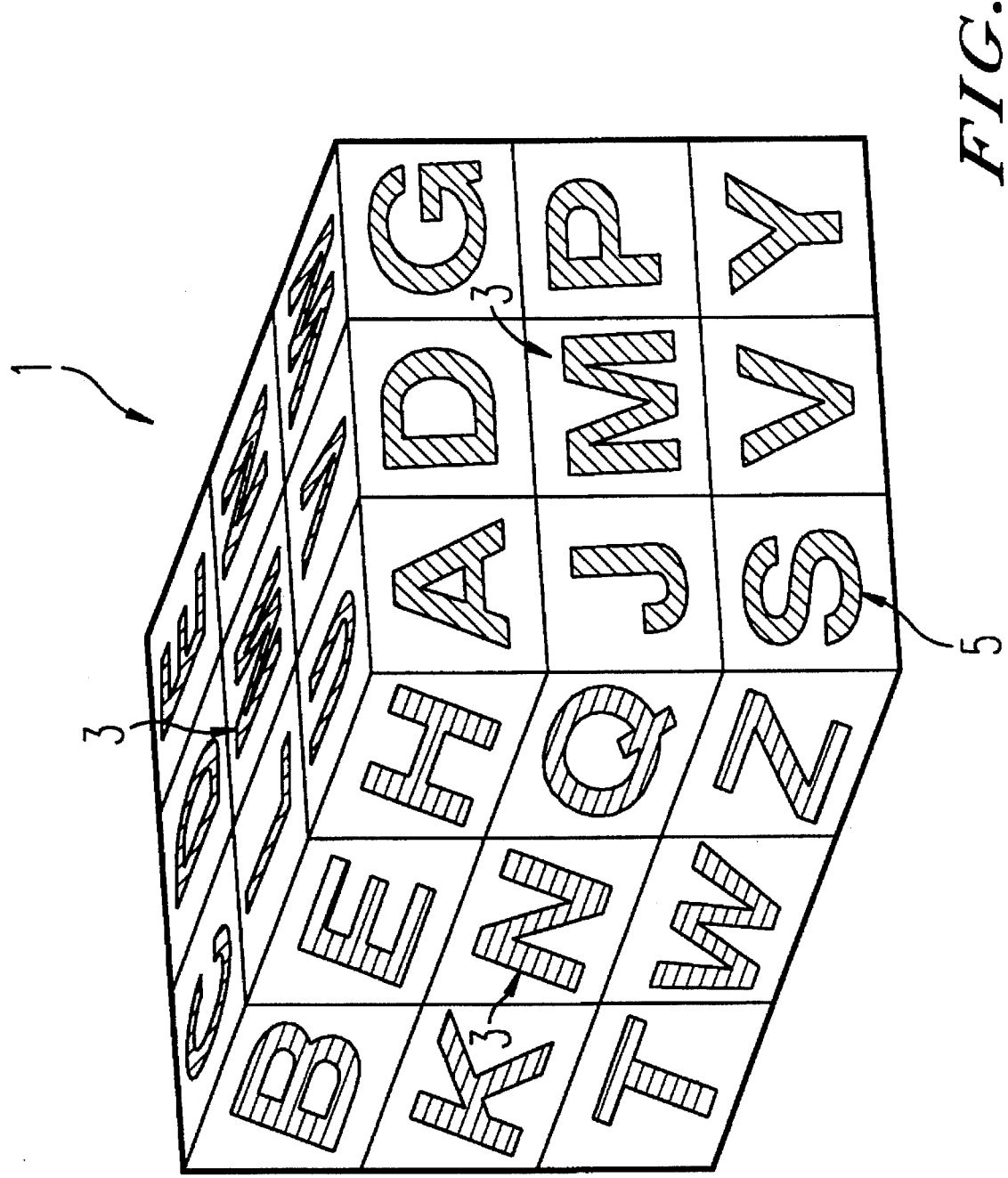
FIG. 1 is a perspective illustration of a cube which serves as the ternary game piece in the preferred embodiment.

Referring now to the drawings, wherein like reference numerals designate identical or corresponding parts throughout the several views, FIG. 1 is a perspective illustration of a cube 1 constructed of, for example, impact resistant plastic, which serves as the ternary game piece in the preferred embodiment. Each of the cube's six faces 3 is preferably divided into nine equal sub-areas 5 on which pictoral characters are printed in accordance with the techniques which will now be described.

The assignment of particular pictoral characters to particular sub-areas 5 is based on characteristics of the ternary (base 3) number system. The ternary number system consists of three digits (0, 1, 2), and representation of a given number is very similar to that in the familiar decimal system if base 3 replaces base 10. For example, $(221)_3 = 2 \times 3^2 + 2 \times 3^1 + 1 \times 3^0 = (25)_{10}$. For a three-digit number represented in the ternary number system, the rightmost digit is said to be in the first ternary digit place, the middle digit is said to be in the second ternary digit place, and the leftmost digit is said to be in the third ternary digit place.

Any pictoral characters may be printed on the sub-areas 5 of the ternary game piece 1. The following description uses letters of the alphabet merely for illustrative purposes.

FIG. 2 shows a data table listing all 26 letters of the alphabet in column 6 along with numbers represented in both the decimal (column 8) and ternary (column 10) number systems assigned to each letter. Each of columns 12, 14, 16, 19, 20, and 22 indicates nine letters which appear on a distinct side 3 of the ternary game piece 1 in the color listed at the top of the column. The assignments of specific letters to specific color groups will now be explained with reference to FIGS. 3A–3F.

FIGS. 3A–3F show six groupings of nine numbers in the range of 1–26 (decimal) represented both in the decimal and ternary number systems, and the corresponding letters of the alphabet to which they have been assigned. The grouping of FIG. 3A is derived from column 22 of FIG. 2, the grouping of FIG. 3B is derived from column 20 of FIG. 2, the grouping of FIG. 3C is derived from column 19 of FIG. 2, the grouping of FIG. 3D is derived from column 16 of FIG. 2, the grouping of FIG. 3E is derived from column 14 of FIG. 2, and the grouping of FIG. 3F is derived from column 12 of FIG. 2. These six groupings are based on the presence of a common ternary digit (0, 1, 2) in a common ternary digit place among each of the 9 listed numbers in each grouping. This will be further explained below with respect to each specific grouping.

The grouping of FIG. 3A consists of all numbers in the range of 1–26 (decimal) whose ternary representation contains the ternary digit "1" in the first ternary digit place (rightmost digit). The letters of the alphabet assigned to these listed decimal numbers (Column 22 of FIG. 2) are printed in yellow, for example, on the nine sub-areas 5 of a first face of the ternary game piece 1. A "1" in the first ternary digit place is equal to $1 \times 3^0 = 1$, and thus a yellow character revealing element 34 has one unit length.

The grouping of FIG. 3B consists of all numbers in the range of 1–26 (decimal) whose ternary representation contains the ternary digit "2" in the first ternary digit place. The letters of the alphabet corresponding to these listed decimal numbers (column 20 of FIG. 2) are printed in blue, for example, on the nine sub-areas 5 of a second face of the ternary game piece 1. A "2" in the first ternary digit place is equal to $2 \times 3^0 = 2$, and thus a blue character revealing element 32 has two unit lengths, or is twice as long as a yellow character revealing element 34.

The grouping of FIG. 3C consists of all numbers in the range of 1–26 (decimal) whose ternary representation contains the ternary digit "1" in the second ternary digit place (middle digit). The letters of the alphabet corresponding to these listed decimal numbers (column 19 of FIG. 2) are printed in orange, for example, on the nine sub-areas 5 of a third face of the ternary game piece. A "1" in the second ternary digit place is equal to $1 \times 3^1 = 3$, and thus an orange character revealing element 30 has three unit lengths, or is three times as long as a yellow character revealing element 34.

The grouping of FIG. 3D consists of all numbers in the range of 1–26 (decimal) whose ternary representation contains the ternary digit "2" in the second ternary digit place. The letters of the alphabet corresponding to these listed decimal numbers (column 16 of FIG. 2) are printed in green, for example, on the nine sub-areas 5 of a fourth face of the ternary game piece 1. A "2" in the second ternary digit place is equal to $2 \times 3^1 = 6$, and thus a green character revealing element 28 has six unit lengths, or is six times as long as a yellow character revealing element 34.

The grouping of FIG. 3E consists of all numbers in the range of 1–26 (decimal) whose ternary representation contains the ternary digit "1" in the third ternary digit place (leftmost digit). The letters of the alphabet corresponding to these listed decimal numbers (column 14 of FIG. 2) are printed in purple, for example, on the nine sub-areas 5 of a fifth face of the ternary game piece 1. A "1" in the third ternary digit place is equal to $1 \times 3^2 = 9$, and thus a purple character revealing element 26 has nine unit lengths, or is nine times as long as a yellow character revealing element 34.

Figure 5:
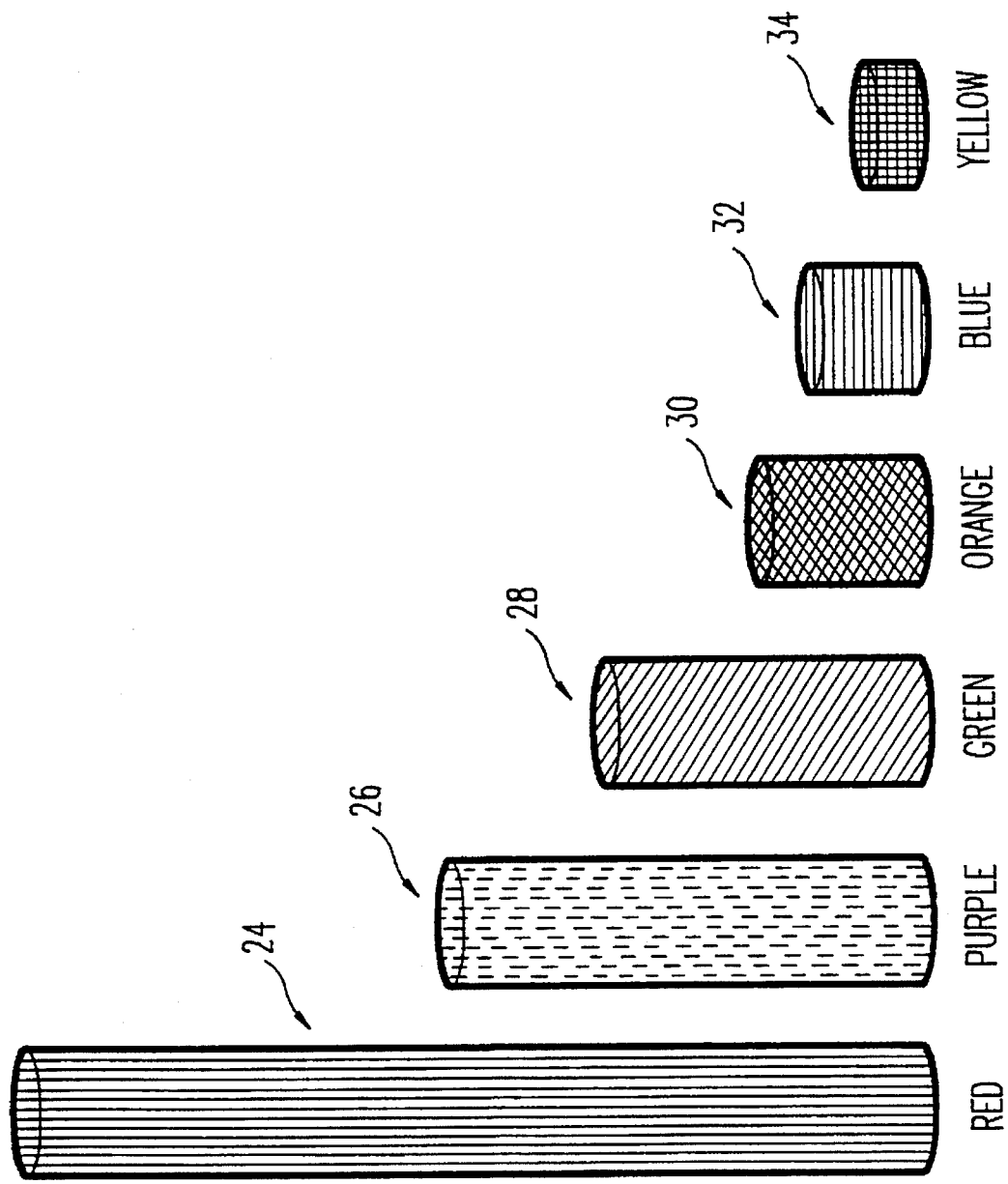
FIG. 5 is a perspective illustration of the character revealing elements having differing lengths and individual colors according to the preferred embodiment.

The grouping of FIG. 3F consists of all numbers in the range of 1–26 (decimal) whose ternary representation contains the ternary digit "2" in the third ternary digit place. The letters of the alphabet corresponding to these listed decimal numbers (column 12 of FIG. 2) are printed in red, for example, on the nine sub-areas 5 of a sixth face of the ternary game piece 1. A "2" in the third ternary digit place is equal to $2 \times 3^2 = 18$, and thus a red character revealing element 24 has 18 unit lengths, or is 18 times as long as a yellow character revealing element 34. FIG. 5 illustrates the color and physical length interrelationship between character revealing elements 24–34. Note that the colors employed in the above description are not limiting, as any colors or other indicia may be employed without departing from the scope of the invention.

Figure 4:
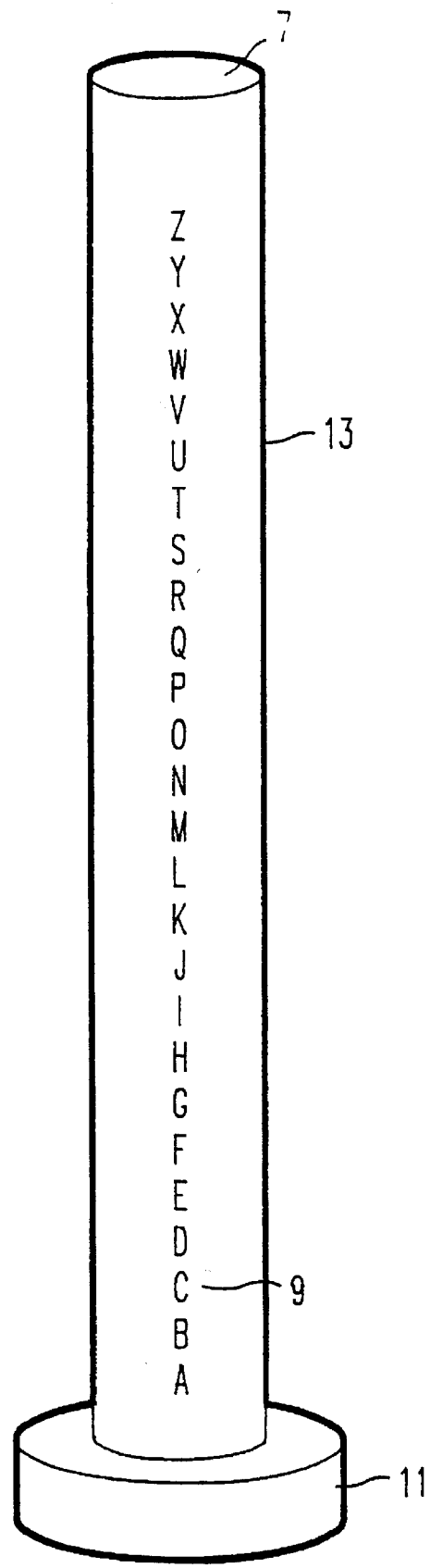
FIG. 4 is a perspective illustration of the character decoding device of the preferred embodiment.

FIG. 4 illustrates a character decoding device in accordance with a preferred embodiment of the present invention. In the preferred embodiment, the character decoding device comprises a hollow cylinder 13 made of a transparent material attached at one end to a base 11. The transparent material of which the hollow cylinder 13 is comprised is preferably plastic, however any equivalent transparent material may be utilized for this purpose. Base 11 is also preferably constructed of plastic or wood, yet all equivalent materials for supporting hollow cylinder 13 are within the scope of the invention. Decoding means 9 is represented as a character measuring scale printed on the hollow cylinder 13. The size of opening 7 of the cylinder 13 is determined so as to permit the placement of character revealing elements 24, 26, 28, 30, 32, and 34 of FIG. 5 therethrough when sliding the character revealing elements into the cylinder 13.

FIG. 5 illustrates the above-mentioned character revealing elements 24, 26, 28, 30, 32, and 34 which in the preferred embodiment are represented by colored cylindrical elements. The cylindrical elements 24, 26, 28, 30, 32, and 34 are preferably comprised of wood or plastic, and may be solid or hollow. The use of materials other than those listed as preferable does not depart from the scope of the invention. Note the color and physical length interrelationship between the character revealing elements derived with regard to FIGS. 3A–3F.

With regard to the above-mentioned character decoding device and character revealing elements, it is to be understood that the listed materials and structures are merely illustrative in nature. The character decoding device of the present invention is in no way limited to the structure described above and shown in FIG. 4. Materials other than plastic and wood may be used in constructing the hollow cylinder 13 and the base 11, and element 13 need not be cylindrical in shape. The character decoding device of the present invention may comprise instead, for example, a pictoral character measuring scale printed along any flat surface against which the character revealing elements are aligned. Likewise, the character revealing elements of the present invention are in no way limited to the colored cylindrical elements shown in FIG. 5. The character revealing elements need not be cylindrical in shape, nor are wood and plastic the only materials with which they may be constructed in accordance with the present invention. Furthermore, color has been chosen as the indicium of the preferred embodiments, however any distinctive markings or symbols may be utilized without departing from the scope of the present invention.

With the arrangement of pictoral characters on the sub-areas 5 of the ternary game piece 1 and the corresponding lengths of the colored character revealing elements 24, 26, 28, 30, 32, and 34 having been explained, operation of the present character revealing game will now be described. The two players will be denoted as "player 1" and "player 2" for purposes of the following description.

Player 1 will show the ternary game piece 1 to player 2 and ask player 2 to secretly select a letter of the alphabet. After selecting a letter, player 2 is then asked to reveal to player 1 all colors in which the secretly selected letter appears on the ternary game piece 1. With this information, player 1 successively slides the character revealing elements 24, 26, 28, 30, 32, and 34 of the corresponding colors into the open end 7 of the cylinder 13 shown in FIG. 4. The resulting height of the stacked character revealing elements within the cylinder 13 indicates a selected letter read off from the character measuring scale 9 arranged on the side of the cylinder 13. The letter of the character measuring scale 9 marked on the cylinder 13 at the top level of the stacked character revealing elements will be the letter secretly selected by player 2.

Returning to FIG. 2, a table listing all 26 letters of the alphabet along with assigned numbers in both decimal and ternary representations is shown. The six rightmost columns (12, 14, 16, 19, 20, 22) indicate the color or colors in which each letter is printed on the ternary game piece, as determined by the groupings of FIGS. 3A–3F. This table allows one to visualize how the stacking of character revealing elements of appropriate colors will yield a reading of the secretly selected letter. For any given letter, locate the letter in the leftmost column 6 of the table of FIG. 2 and read horizontally across that row to the six rightmost columns (12, 14, 16, 19, 20, 22). All colors indicated for a particular letter (i.e., any particular row) correspond to the individual colored character revealing elements that must be stacked (i.e., added) within the cylinder 13 to reveal the letter in question. Thus, for example, the letter "M" appears in purple, orange, and yellow on the ternary game piece 1, and the successive placement of the purple 26, orange 30, and yellow 34 character revealing elements into the open end 7 of the cylinder 13 will yield a total stacked character revealing element length reaching the letter "M" on the character measuring scale 9. Thus, mere knowledge of only the colors in which a secretly selected letter appears on the ternary game piece 1 is sufficient to enable player 1 to ascertain the secretly selected letter.

The invention has been described with respect to letters of the alphabet, of which there exist 26 distinct pictoral characters, however any set of 39 or fewer distinct pictoral characters may be employed without departing from the spirit and scope of the invention. Likewise, a cube need not be used as the ternary game piece and cylindrical elements of the disclosed colors need not be utilized as the character revealing elements. Such representations have been introduced merely for illustrative purposes, and it is fully within the scope of this invention to employ equivalent means.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the U.S. is:

1. A character revealing game comprising:

a ternary game piece having a surface area on which distinct pictoral characters are arranged in groups such that all of said distinct pictoral characters within a given group share a common indicium;

a plurality of character revealing elements, each one of said plurality of character revealing elements having a distinct physical length and an indicium corresponding to an indicium of exactly one of said groups of distinct pictoral characters arranged on said ternary game piece; and a character decoding device having means for permitting arrangement of at least one of said plurality of character revealing elements in an additive manner such that a total physical length of said at least one of said plurality of character revealing elements is formed, and decoding means for ascertaining one of said distinct pictoral characters corresponding to said total physical length of said at least one of said plurality of character revealing elements.

2. A character revealing game according to claim 1, wherein said surface area of said ternary game piece is divided into a plurality of sub-areas, and wherein exactly one of said distinct pictoral characters is arranged on each one of said plurality of sub-areas.

3. A character revealing game according to claim 2, wherein said ternary game piece comprises a cube having six sides, each of said six sides being divided into nine sub-areas.

4. A character revealing game according to claim 3, wherein said distinct pictoral characters comprise letters of an alphabet.

5. A character revealing game according to claim 4, wherein each one of said indicia comprises a distinct color.

6. A character revealing game according to claim 5, wherein each one of said plurality of character revealing elements comprises a cylindrical element.

7. A character revealing game according to claim 6, wherein said character decoding device comprises transparent containing means mounted on a base, and wherein said decoding means comprises a pictoral character measuring scale arranged on said transparent containing means.

8. A method of making a character revealing game, comprising the steps of:
  (a) selecting a set of not more than 39 distinct pictoral characters;
  (b) assigning to each of said distinct pictoral characters a distinct number represented in the ternary number system;
  (c) forming a ternary game piece having a surface area;
  (d) arranging said distinct pictoral characters in groups on said surface area of said ternary game piece such that all pictoral characters of Said set whose corresponding ternary number representation comprises a common ternary digit in a common ternary digit place form a single group and are arranged on said ternary game piece with an indicium distinct to said single group;
  (e) forming a plurality of character revealing elements equal in number to a number of groups of said distinct pictoral characters on said ternary game piece, each one of said plurality of character revealing elements having a distinct physical length and an indicium corresponding to an indicium of exactly one of said groups of said distinct pictoral characters; and
  (f) forming a character decoding device which permits arrangement of at least one of said plurality of character revealing elements in an additive manner such that a total physical length of said at least one of said plurality of characters revealing elements is formed, said character decoding device including decoding means for indicating one of said distinct pictoral characters corresponding to said total physical length of said at least one of said plurality of character revealing elements.

9. The method of making a character revealing game according to claim 8, further comprising the step of dividing said surface area of said ternary game piece into a plurality of sub-areas, and arranging exactly one of said plurality of distinct pictoral characters on each one of said plurality of sub-areas.

10. The method of making a character revealing game according to claim 9, wherein the step (a) consists of selecting letters of an alphabet.

11. The method of making a character revealing game according to claim 10, wherein the step (c) consists of forming a cube having six sides, and dividing each of said six sides into nine sub-areas.

12. The method of making a character revealing game according to claim 11, wherein the step (d) consists of arranging said letters of an alphabet on a surface area of said cube such that all letters arranged on one of said six sides form a group and appear in one color on said one of said six sides.

13. The method of making a character revealing game according to claim 12, wherein the step (e) consists of forming a plurality of cylindrical elements each having a distinct color.

14. The method of making a character revealing game according to claim 13, wherein the step (f) consists of forming transparent containing means, mounting said transparent containing means on a base, and arranging a pictoral character measuring scale on said transparent containing means.

15. A method of playing a character revealing game, comprising the steps of:
  (a) selecting one of a plurality of pictoral characters appearing on a surface area of ternary game piece;
  (b) revealing all indicia with which the selected one of said plurality of pictoral characters appears on said ternary game piece;
  (c) arranging character revealing elements having indicia identical to said indicia with which said selected one of said plurality of pictoral characters appears on said ternary game piece in an additive manner such that a total physical length of said character revealing elements is formed; and
  (d) ascertaining said selected one of said plurality of pictoral characters via decoding means of a character decoding device, said selected one of said plurality of pictoral characters corresponding to said total physical length of said character revealing elements.

16. The method of playing a character revealing game according to claim 15, wherein the step (a) consists of selecting a letter of an alphabet appearing on a surface area of a cube having six sides, each of said six sides being divided into nine sub-areas.

17. The method of playing a character revealing game according to claim 15, wherein the step (b) consists of revealing all colors in which said selected one of said plurality of pictoral characters appears on said ternary game piece.

18. The method of playing a character revealing game according to claim 17 wherein the step (c) consists of aligning cylindrical elements having colors identical to said colors in which said selected one of said plurality of pictoral characters appears on said ternary game piece within transparent containing means mounted on a base.

19. The method of playing a character revealing game according to claim 18, wherein said step (d) consists of reading said selected one of said plurality of pictoral characters appearing on said ternary game piece from a pictoral character measuring scale arranged on said transparent containing means.

\* \* \* \* \*